United States Patent [19]

Hain et al.

[11] Patent Number: 4,590,833
[45] Date of Patent: May 27, 1986

[54] AUTOMATIC FEED FOR FOOD-SLICING MACHINE

[75] Inventors: Gottfried Hain, Ramerberg; Karl-Heinz Krebs, Grosskarolinenfeld, both of Fed. Rep. of Germany

[73] Assignee: Alpma Alpenland Maschinenbau & Co. KG, Rott am Inn, Fed. Rep. of Germany

[21] Appl. No.: 636,543

[22] Filed: Aug. 1, 1984

[30] Foreign Application Priority Data

Aug. 1, 1983 [DE] Fed. Rep. of Germany ....... 3327747

[51] Int. Cl.$^4$ ............................................. B26D 7/06
[52] U.S. Cl. ........................................ 83/367; 83/355; 83/401; 83/423; 83/436; 198/625
[58] Field of Search .................. 83/436, 423, 401, 355, 83/356.3, 276, 278, 77, 367, 71, 72, 73; 198/625

[56] References Cited

U.S. PATENT DOCUMENTS

| | | | |
|---|---|---|---|
| 1,939,741 | 12/1933 | Van Berkel | 83/436 X |
| 3,161,215 | 12/1964 | Werder et al. | 83/276 X |
| 3,176,829 | 4/1965 | Wathen | 198/625 |
| 3,855,889 | 12/1974 | Wiley | 83/490 |

FOREIGN PATENT DOCUMENTS 3241374 5/1983 Fed. Rep. of Germany ........ 83/401
3327747 5/1983 Fed. Rep. of Germany .

Primary Examiner—James M. Meister
Attorney, Agent, or Firm—Karl F. Ross; Herbert Dubno

[57] ABSTRACT

A slicing machine has a table defining a horizontal and flat support surface having an outer edge and a blade displaceable transversely along the edge. Thus when the blade moves along the edge a slice is cut from an elongated foodstuff projecting longitudinally over the edge. An automatic feed for the slicing machine includes a pair of feed elements centered on and rotatable about respective parallel longitudinal axes spaced apart transversely above the surface to either side of the foodstuff and each formed with a flat outer end immediately juxtaposed with the edge, and a helicoidal formation at least generally centered on the axis, engageable with the elongated foodstuff between the elements, and extending to the respective outer end. A drive rotates the elements about the respective axes for advancing the foodstuff gripped between the elements in a longitudinal transport direction along the surface toward the edge. The foodstuff is gripped between the element ends immediately adjacent the table edge so that it can be completely sliced.

9 Claims, 3 Drawing Figures

AUTOMATIC FEED FOR FOOD-SLICING MACHINE

FIELD OF THE INVENTION

The present invention relates to a slicing machine of the type used on cheese, luncheon meats, boned meat, wurst, and the like. More particularly this invention concerns a feed that advances the foodstuff to the cutting implements.

BACKGROUND OF THE INVENTION

The standard slicing machine has a table along whose upper surface the elongated foodstuff to be sliced is slid toward an edge of the table. A blade is passed along this edge to cut off the projecting end of the foodstuff. The foodstuff can be advanced slowly or in steps while the blade is reciprocated across the edge to cut a succession of thin slices from the foodstuff.

In order to automate this process it is known to provide such a machine with a feed that automatically advances the foodstuff longitudinally toward the edge. This feed typically is a driven belt or array of rollers, or even two belts or roller arrays that grip the foodstuff. Such an arrangement has the considerable disadvantage that the foodstuff which here constitutes the workpiece is engaged at a distance from the edge which is at least equal to the radius of curvature of the furthest downstream roller or pulley. This means that the end of each foodstuff strand will be sloppily sliced and might even fall out of the machine.

In addition such a machine must normally be carefully reset whenever the foodstuff thickness changes much. Furthermore, although it is possible to feed foodstuffs of the same thickness one directly following the other, it is necessary to completely slice the foodstuff in process before the machine can be reset and the thicker or thinner foodstuff can be fed. This results in wasteful down time for the machine.

OBJECTS OF THE INVENTION

It is therefore an object of the present invention to provide an improved feed for a slicing machine.

Another object is the provision of such a feed for a slicing machine which overcomes the above-given disadvantages, that is which grips the foodstuff right up to the cutting plane and that can automatically adjust for foodstuffs of different thicknesses.

A further object is to provide an improved method of operating such a slicer.

SUMMARY OF THE INVENTION

A slicing machine according to the invention has a table defining a horizontal and flat support surface having an outer edge and a blade displaceable transversely along the edge. Thus when the blade moves along the edge a slice is cut from an elongated foodstuff projecting longitudinally over the edge. An automatic feed for the slicing machine includes a pair of feed elements centered on and rotatable about respective parallel longitudinal axes spaced apart transversely above the surface to either side of the foodstuff and each formed with a flat outer end immediately juxtaposed with the edge, and a helicoidal formation at least generally centered on the axis, engageable with the elongated foodstuff between the elements, and extending to the respective outer end. A drive rotates the elements about the respective axes for advancing the foodstuff gripped between the elements in a longitudinal transport direction along the surface toward the edge. The foodstuff is gripped between the element ends immediately adjacent the table edge so that it can be completely sliced. In fact it is possible to neatly slice the entire foodstuff right to its end.

The table edge according to this invention is straight and the blade has an edge displaceable along the table edge substantially in a plane. The outer ends are substantially planar, parallel to the plane of the edges, and perpendicular to the direction. The blade edge in fact lies in a plane and the blade is rotated about a blade axis perpendicular to the blade plane and generally perpendicular to the edge plane. For slicing action this blade axis is reciprocated in a straight line along the edge or orbited in a circular path along it. In a continuous feed system the blade axis forms an acute angle with the edge plane. Thus only the blade edge engages the table edge and the rest of the blade is out of contact with the table edge.

The formations according to this invention normally are sharp-edged ridges, like a screwthread. In addition two such elements with helicoidal formations can be provided one above the other to one side of the foodstuff, rotatable about respective axes. The axis of the element on the other side of the foodstuff is vertically between the axes of the one side.

One of the elements according to this invention is movable along the surface perpendicular to the direction toward the other element. This movable element is urged by a spring or fluid cylinder transversely toward the other element to grip the foodstuff transversely between the elements. The movable element is axially substantially shorter than the other and the feed has a guide immediately upstream relative to the travel direction from the one short element. This guide is urged transversely against the foodstuff and toward the other element. Such a guide is a generally planar array of rollers and can assume an inclination with respect to the transport direction.

In addition a sensor is provided upstream of the guide for detecting horizontal transverse foodstuff width. An upstream feed engages the foodstuff upstream of the guide and can advance the foodstuff downstream in the travel direction. A controller is connected between the sensor, drive, and upstream feed for arresting the foodstuff upstream of the guide with the upstream feed while continuing to advance the foodstuff downstream of the guide with the elements when the sensor means detects a substantial increase in foodstuff width.

The method according to this invention therefore comprises the steps of positioning an elongated foodstuff between the elements, urging one of the elements toward the other element and against the foodstuff to grip same with the helicoidal formations, and rotating the elements to advance the foodstuff in a horizontal travel direction generally perpendicular to the table edge at a travel rate.

According to further features of the method this invention the foodstuff is engaged upstream of the guide with a drive to alternately advance and hold the foodstuff upstream of the guide. The horizontal thickness of the foodstuff is detected transverse to the direction of the foodstuff upstream of the guide and the foodstuff is arrested upstream of the guide while continuing to advance it in the travel direction downstream therefrom with the elements when the detected foodstuff thickness increases and is advanced upstream of the guide when the detected foodstuff thickness stays substantially the same or decreases. When the foodstuff thickness increases, which occurs when the foodstuff changes, the movable element must move away from the other element to accommodate the thicker foodstuff. According to this invention the thinner foodstuff is allowed to pass the short element before the thicker one is fed to it. Of course when thickness decreases the rotatable advance elements can move in to grip the thinner foodstuff as soon as the thicker one runs out, so that this thinner one can immediately succeed the thicker one.

The foodstuff is arrested when the thickness increases for an amount of time equal at least to the axial length of the short element divided by the travel rate of the foodstuff effected by the elements. This results in the new foodstuff being fed in the instant the preceding one has cleared the elements which are biased together to immediately move in and grip the new foodstuff.

DESCRIPTION OF THE DRAWING

The above and other features and advantages will become more readily apparent from the following, it being understood that any feature described with reference to only one embodiment of the invention can be used where possible with the other embodiment. In the accompanying drawing.

SPECIFIC DESCRIPTION

Figure 1:
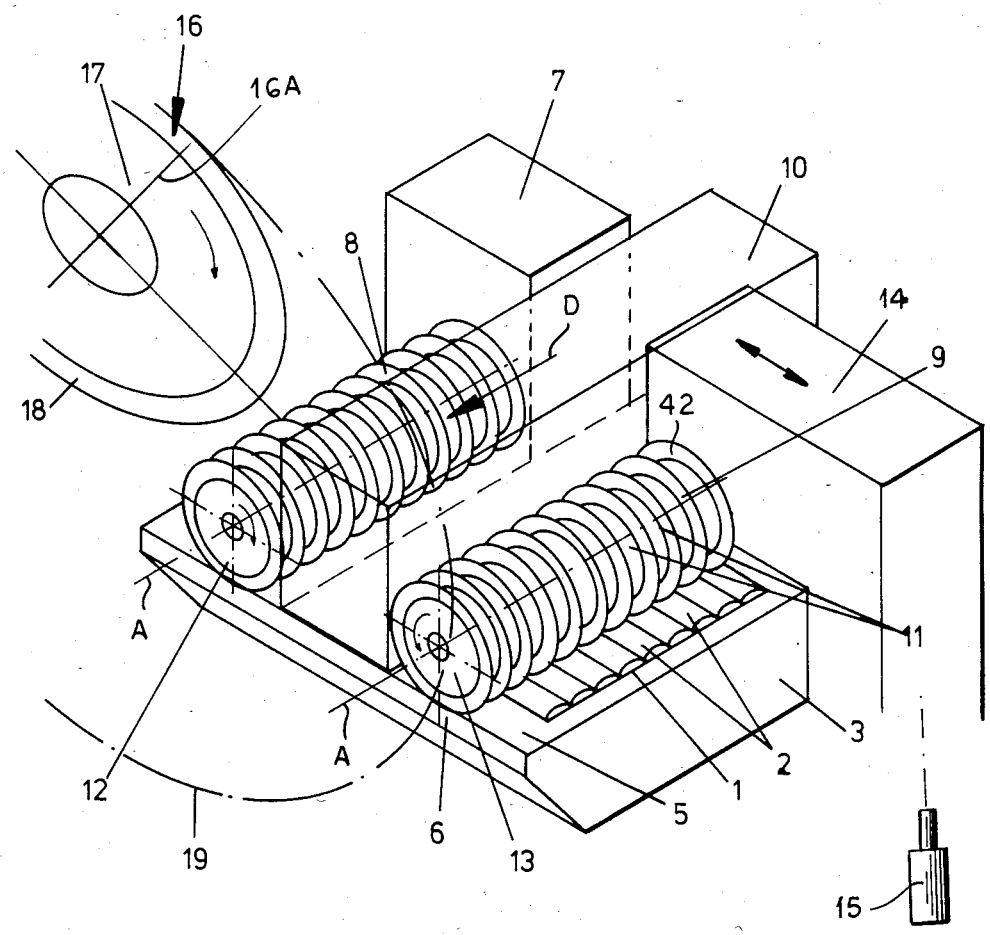
FIG. 1 is a perspective view of one machine according to this invention.

As seen in FIG. 1 an automatic slicing apparatus according to this invention has a longitudinal conveyor 1 formed by an array of rollers 2 rotatable about horizontal axes extending perpendicular to a longitudinal displacement direction D. The apparatus has a support 3 whose upper surface 5 is planar and formed with a cutout 1 from which the rollers 2 project. This surface 5 has an outer edge 6 lying in a plane perpendicular to the direction D and to the surface 5.

A circular blade 16 is rotatable about a blade axis 16A forming a slightly acute angle with the plane of the edge 6. This blade 16 has a flat circular body 17 and an annular circular cutting edge 18 that cah sweep along the edge 6 when the blade is orbited in the circular path shown at 19. This action cuts a slice off the end of a foodstuff, here a square-section cheese 10, projecting over the edge 6 and extending in the direction D.

According to this invention the foodstuff 10 is gripped between a pair of substantially identical drive cylinders 8 and 9 centered on respective axes A parallel to the direction D. These drive cylinders 8 and 9 have planar outer ends 12 and 13 which lie at or immediately upstream in the direction D of the plane of the edge 6. They are cantilevered from supports 7 and 14 on the base 3, the latter support 14 being movable transversely to the direction D by a cylinder 15.

Each cylinder 8 and 9 is formed with a helical sharpedged ridge 42 between 1 mm and 4 mm high and centered on the respective axis A. These ridges 42 can engage the foodstuff 10 to displace it in the direction D on the rollers 2 without damaging the foodstuff 10. The drive cylinder 9 is urged toward the cylinder 8 and both cylinders 8 and 9 are rotated so as to advance the cheese 10 in the direction D either continuously or discontinuously. If the blade 16 is tipped as described above the advance can be continuous, as the flat center portion 17 of the blade will be offset from the edge 6 and will not inhibit advance of the foodstuff.

It is also possible to make both supports or mounts 7 and 14 displaceable on the base 3. This is easily done with a spindle having one threaded part engaging the one mount 7 and another threaded part of opposite hand engaging the other mount so that when rotated in one direction they move together and when oppositely rotated they move apart. Normally a total or combined transverse stroke or displacement of 20 mm to 40 mm is enough to accommodate most standard foodstuffs.

Figure 2:
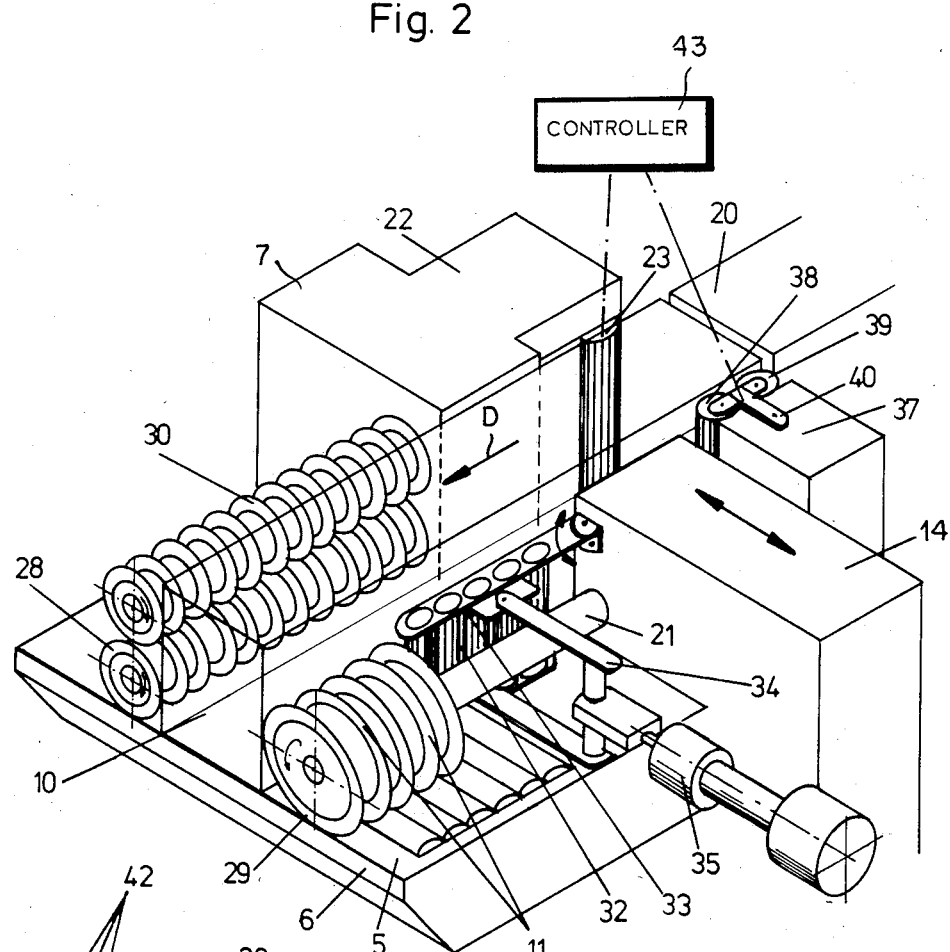
FIG. 2 is a perspective view of another machine in accordance with the invention.
Figure 3:
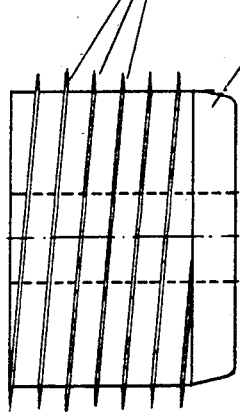
FIG. 3 is a large-scale side view of a detail of this invention.

The arrangement of FIG. 2 has, instead of the single element 8, two smaller but similar such elements 30 having end faces 28 at the edge 6 and rotatable about respective axes above and below the axis of a roller 29 taking the place of the roller 9. This roller 29 is of the same diameter as the roller 9, but is much shorter so that its helical ridge 11 only has a few turns. Between this element 29 and the support 14 is an array of rollers 32 carried on a frame 33 pivotal on the support 14 about a vertical axis. A shaft 21 carrying the element 29 extends from this support 14 through a U-shaped yoke 34 that attaches the frame 33 to a cylinder 35 normally pressurized to urge the rollers 32 transversely against the cheese 10.

With this arrangement the support 7 has a drive housing 22 provided with an upright ridged drive roller 23 that is operated by a controller 43. A pair of sensor rollers 38 and 39 spaced apart in the direction D are carried on a pivotal support 40 across from this drive roller 23 on a control-unit housing 37 also connected to the controller 43.

The rollers 38 and 39 will pivot forward in the direction D when workpiece thickness decreases and backward when it increases, as shown here when a thicker cheese 20 succeeds the foodstuff 10. When the workpiece width increases the controller 43 arrests the roller 23 for an amount of time sufficient for the foodstuff 10 to advance in the direction D through a distance equal to the axial length of the element 29. Then the drive 23 is restarted. As soon as the last piece of the preceding workpiece 10, which can be only 1 mm thick, is sliced, the element 29 is moved away from the elements 28 and 30 by the controller 43, to which end it is connected to the actuator 15 also.

With the system of this invention it is therefore possible to slice up a foodstuff right to its end. The foodstuff is supported virtually at the location where each cut is made so that very little is wasted.

We claim:

1. In combination with a slicing machine having:
    a table defining a horizontal and flat support surface having an outer edge, and
    a blade displaceable transversely along the edge, whereby when the blade moves along the edge a slice is cut from an elongated foodstuff projecting longitudinally over the edge, a feed comprising:
    a pair of cantilevered feed elements centered on and rotatable about respective parallel longitudinal axes spaced apart transversely above the surface to either side of the foodstuff and each formed with
        a flat and unsupported outer end immediately juxtaposed with the edge, and
        a helicoidal formation at least generally centered on the respective axis, engageable with the elongated foodstuff between the elements, and extending to the respective outer end;

biasing means for urging one of the feed elements radially of its axis toward the other element and thereby gripping the foodstuff between the elements; and drive means for rotating the elements about the axes for advancing the foodstuff gripped between the elements in a longitudinal transport direction along the surface toward the edge, the foodstuff being gripped between the element ends immediately adjacent the table edge.

2. The combination defined in claim 1 wherein the edge is straight and the blade has an edge displaceable along the table edge substantially in a plane, the outer ends being substantially planar, parallel to the plane of the edges, and perpendicular to the direction.

3. The combination defined in claim 1 wherein the blade axis forms an acute angle with the edge plane, whereby the blade edge engages the table edge and the rest of the blade is out of contact with the table edge.

4. The combination defined in claim 2 wherein the formations are sharp-edged ridges.

5. The combination defined in claim 2 wherein two such elements with helicoidal formations are provided one above the other to one side of the foodstuff, rotatable about respective axes, the axis of the element on the other side of the foodstuff being vertically between the axes of the one side.

6. The combination defined in claim 2 wherein the elements are generally cylindrical.

7. The combination defined in claim 1 wherein the one element is axially substantially shorter than the other and the feed further comprises a guide immediately upstream relative to the travel direction from the one short element; and means urging the guide transversely against the foodstuff and toward the other elements.

8. The combination defined in claim 7 wherein the guide is a generally planar array of rollers and can assume an inclination with respect to the transport direction.

9. The combination defined in claim 8, further comprising:

sensor means upstream of the guide for detecting horizontal transverse foodstuff width;

upstream feed means engaging the foodstuff upstream of the guide and operable for advancing the foodstuff downstream in the travel direction; and control means connected between the sensor means, drive means, and feed means for arresting the foodstuff upstream of the guide with the upstream feed means while continuing to advance the foodstuff downstream of the guide with the elements when the sensor means detects a substantial increase in foodstuff width.

* * * * *